United States Patent [19]

DeGroot, Jr. et al.

[11] Patent Number: 5,952,419
[45] Date of Patent: Sep. 14, 1999

[54] CURABLE ORGANOSILOXANE-POLYISOBUTYLENE MIXTURES

[75] Inventors: Jon Vierling DeGroot, Jr.; Carl Allen Fairbank; William James Schulz, Jr., all of Midland, Mich.

[73] Assignee: Dow Corning Corporation, Midland, Mich.

[21] Appl. No.: 09/209,193

[22] Filed: Dec. 10, 1998

Related U.S. Application Data

[63] Continuation-in-part of application No. 08/854,793, May 12, 1997, abandoned.

[51] Int. Cl.$^6$ .................................................. C08L 83/07
[52] U.S. Cl. ........................ 524/506; 524/588; 524/862; 524/849; 524/847; 524/493; 525/106
[58] Field of Search ..................................... 524/506, 588, 524/862, 849, 847, 493; 525/106

[56] References Cited

U.S. PATENT DOCUMENTS

| | | | |
|---|---|---|---|
| 3,328,482 | 6/1967 | Northup et al. | 260/825 |
| 4,753,978 | 6/1988 | Jensen | 524/862 |
| 4,831,081 | 5/1989 | King, III et al. | 525/105 |
| 5,447,990 | 9/1995 | Noda et al. | 525/106 |
| 5,672,660 | 9/1997 | Medsker et al. | 525/101 |

FOREIGN PATENT DOCUMENTS

| | | |
|---|---|---|
| 0 220 809 | 5/1987 | European Pat. Off. . |
| 2393831 | 1/1979 | France . |
| 63-199277 | 8/1988 | Japan . |

*Primary Examiner*—Robert Dawson
*Assistant Examiner*—Caixia Lu-Rutt
*Attorney, Agent, or Firm*—Jennifer S. Warren

[57] ABSTRACT

A curable organosiloxane-polyisobutylene composition comprising 20 to 87 weight percent of a polyisobutylene comprising at least 2 alkenyl groups per molecule, 0.4 to 70 weight percent of a polyorganosiloxane comprising at least 2 silicon-bonded alkenyl groups per molecule, 7 to 50 weight percent of a treated reinforcing silica filler, an amount sufficient to cure the composition of an organohydrogensiloxane crosslinker, and a platinum-group metal hydrosilation catalyst in an amount sufficient to effect curing of the composition. Cured elastomers prepared from the compositions can have improved resistance to gas and vapor permeability.

21 Claims, No Drawings

CURABLE ORGANOSILOXANE-POLYISOBUTYLENE MIXTURES

This is a continuation in part of application Ser. No. 08/854,793 filed on May 12, 1997, which is abandoned on Feb. 5, 1999.

BACKGROUND OF INVENTION

The present invention is a curable organosiloxane-polyisobutylene composition comprising 20 to 87 weight percent of a polyisobutylene comprising at least two alkenyl groups per molecule, 0.4 to 70 weight percent of a polyorganosiloxane comprising at least 2 silicon-bonded alkenyl groups per molecule, 7 to 50 weight percent of a treated reinforcing silica filler, an organohydrogensiloxane crosslinker in an amount sufficient to cure the composition of, and a platinum-group metal hydrosilation catalyst in an amount sufficient to effect curing of the composition.

Platinum-group metal curable polydiorganosiloxane compositions which cure to form elastomers are well known in the art and the consistency of such compositions can vary from that of a flowable liquid to a high-consistency gum. These curable polydiorganosiloxane compositions have found many applications in areas requiring good material flexibility and strength within a wide temperature range, high stability to heat and chemical degradation, and areas requiring good electrical insulating ability. Such areas of applications include automotive hoses, protective boots, and spark plug wiring and boots. In addition such curable polysiloxanes, particularly those commonly referred to as liquid silicone rubber (LSR), are useful as protective coatings for fabrics and as optically clear compositions suitable for forming face mask. Although such curable polydiorganosiloxane compositions when cured typically present a significant barrier to chemical and moisture permeation, in some applications it is desirable to further reduce the chemical and moisture permeation of the cured composition.

The present inventors have found that the incorporation of a polyisobutylene comprising at least 2 alkenyl groups per molecule into a platinum-group metal curable polyorganosiloxane composition results in cured elastomers having improved resistance to gases and water vapor permeation. The alkenyl groups of the polyisobutylene allows the polyisobutylene to be crosslinked by a hydrosilation-type reaction during curing of the composition thereby providing for a cured polydiorganosiloxane-polyisobutylene elastomer having good physical properties such as tear and elongation.

Northrup et. al., U.S. Pat. No. 3,328,482, teach a silicone release agent which can consist essentially of a vinyl end-terminated polydiorganosiloxane, a polymeric material consisting of butylene having a molecular weight over 400, organohydrosiloxane, and chloroplatinic acid.

French Publication No. 2,393,831, describes curable compositions comprising hydroxy end-terminated polydiorganosiloxanes and polybutylenes with a number-average molecular weight ranging from 300 to 2500. The presence of the polybutylene in the composition is reported to reduce permeability of the cured compositions to gases and vapors.

Alexander et al., EPO Patent Publication No. 0-220-809A2, describe a flowable elastomer forming composition comprising a polydiorganosiloxane having silicon-bonded hydroxyl groups and polybutylene. The composition is reported to have a lowered water vapor permeability.

Katsuno, JP 63-199277, describes a sealant composition comprising an polyorganosiloxane, inorganic filler, and polyisobutylene. The composition is reported to have enhanced resistance to temperature changes and improved water proofing.

SUMMARY OF INVENTION

The present invention is a curable organosiloxane-polyisobutylene composition comprising 20 to 87 weight percent of a polyisobutylene comprising at least 2 alkenyl groups per molecule, 0.4 to 70 weight percent of a polyorganosiloxane comprising at least 2 silicon-bonded alkenyl groups per molecule, 7 to 50 weight percent of a treated reinforcing silica filler, an amount sufficient to cure the composition of an organohydrogensiloxane crosslinker, and a platinum-group metal hydrosilation catalyst in an amount sufficient to effect curing of the composition. Cured elastomers prepared from the compositions can have improved resistance to gas and vapor permeability.

DESCRIPTION OF INVENTION

The present invention is curable polydiorganosiloxane-polyisobutylene compositions and elastomers prepared therefrom. The curable polydiorganosiloxane-polyisobutylene composition comprises:

(A) 20 to 87 weight percent of a polyisobutylene comprising at least 2 alkenyl groups per molecule,
(B) 0.4 to 70 weight percent of a polyorganosiloxane comprising at least 2 silicon-bonded alkenyl groups per molecule,
(C) 7 to 50 weight percent of a treated reinforcing silica filler,
(D) an amount sufficient to cure the composition of an organohydrogensiloxane crosslinker, and
(E) a platinum-group metal hydrosilation catalyst in an amount sufficient to effect curing of the composition.

The polyisobutylene useful in the present invention is not limiting and can be any isobutylene polymer or copolymer comprising at least 2 alkenyl groups per molecule, where the alkenyl groups are capable of undergoing a hydrosilation type addition reaction. The polyisobutylene can consist essentially of monomers described by formula —CH$_2$C(CH$_3$)$_2$—, where the polymer resulting therefrom comprises at least to alkenyl groups per molecule. Such polymers may contain lessor amounts of other substituents in the polymer chain provided such substituents do not alter the function of the polyisobutylene in the present compositions.

The polyisobutylene comprises at least 2 alkenyl groups per molecule where the alkenyl groups can be located at the termninal positions, pendant positions, or both positions of the molecular chain. The alkenyl groups may comprise a portion of a pendant group of the molecular chain.

A preferred polyisobutylene for use in the present composition is an alkenyl end-terminated polyisobutylene described, for example, by formula $$R^1\{CH_2C(CH_3)_2\}_nCH_2R^1 \qquad (1)$$

where n is a number such that the number average molecular weight ($M_n$) of the alkenyl end-terminated polyisobutylene is within a range of about 200 to 100,000 and each $R^1$ is an independently selected alkenyl group comprising about 2 to 12 carbon atoms. Preferred is when $R^1$ is an alkenyl group comprising about 2 to 6 carbon atoms. $R^1$ can be, for example, vinyl, allyl, methylvinyl propenyl, butenyl, pentenyl, and hexenyl. Preferred is when $R^1$ is vinyl. Preferred is when n is a number such that the molecular weight ($M_n$) of the vinyl end-terminated polyisobutylene is within a range of about 200 to 50,000. Even more preferred is when n is a number such that the molecular weight ($M_n$) of the vinyl end-terminated polyisobutylene is within a range of about 2,000 to 20,000. The above described $M_n$ ranges for the polyisobutylene are generally applicable to all polyisobutylene polymers falling within the scope of component (A) and are not limited to alkenyl end-terminated polyisobutylenes described by formula (1).

The polyisobutylene can comprise about 20 to 87 weight percent of the total weight of the composition. Preferred is when the polyisobutylene comprises about 50 to 87 weight percent of the total weight of the composition. Methods for making polyisobutylenes comprising at least 2 alkenyl groups useful in the present compositions are well known in the art. Useful methods are described, for example, in Sakaguchi et al., EP 0-709-403 A1, which is incorporated herein by reference for the teaching of such methods.

The present composition requires the presence of 0.4 to 70 weight percent of component (B), based on the total weight of the composition. Preferred is where the composition comprises about 5 to 30 weight percent of component (B), based on the total weight of the composition.

Component (B) is a polyorganosiloxane comprising at least two silicon-bonded alkenyl groups per molecule. In component (B) the alkenyl groups can comprise 2 to about 12 carbon atoms. In component (B) it is preferred that the alkenyl groups comprise about 2 to 6 carbon atoms, with vinyl and hexenyl being preferred alkenyl groups. Most preferred is when the alkenyl groups are vinyl. Component (B) can be, for example, an alkenyldiorganosiloxy-terminated polydiorganosiloxane, a triorganosiloxy-terminated polydiorganosiloxane having pendant alkenyl substitution on silicon atoms, or an alkenyldiorganosiloxy-terminated polydiorganosiloxane having pendant alkenyl substitution on silicon atoms. Component (B) can have a viscosity ranging from that of a liquid to a gum.

A preferred component (B) is a vinyldiorganosiloxy terminated polydiorganosiloxane having a viscosity within a range of about 20 Pa.s to 200 Pa.s at 25° C. and containing essentially no ethylenically unsaturated hydrocarbon radicals bonded to non-terminal silicon atoms. The preferred component (B) can be described by, for example, formula

$$ViR^2{}_2SiO(R^3{}_2SiO)_mSiR^2{}_2Vi. \qquad (2)$$

In Formula (2), Vi represent a vinyl radical, $R^2$ and $R^3$ are independently selected saturated monovalent hydrocarbon radicals comprising about one to 20 carbons atoms, and m represents a degree of polymerization equivalent to a viscosity of about 20 Pa.s to 200 Pa.s at 25° C. Preferred is when m represents a degree of polymerization equivalent to a viscosity of about 40 Pa.s to 70 Pa.s at 25° C. The preferred component (B) contains essentially no ethylenically unsaturated hydrocarbon radicals bonded to non-terminal silicon atoms. By the term "essentially no ethylenically unsaturated hydrocarbon radicals bonded to non-terminal silicon atoms," it is meant that the only ethylenically unsaturated hydrocarbon radicals present on the non-terminal silicon atoms of component (B) result from impurities present in the reactants used to prepare component (B) or from undesired rearrangements occurring during the preparation of component (B).

In the preferred component (B), it is preferred that $R^2$ be an alkyl comprising about one to four carbon atoms. Most preferred is when all of the $R^2$ substituents of component (B) are methyl.

In the preferred component (B) it is desirable that at least one of the $R^3$ radicals substituted on the non-terminal silicon atoms be an alkyl comprising about 1 to 4 carbon atoms, preferably methyl. The other $R^3$ radicals substituted on the non-terminal silicon atoms can be alkyls such as methyl or ethyl, substituted alkyls such as chloromethyl, 3-chloropropyl, or 3,3,3-trifluoropropyl; cycloalkyls such as cyclopentyl or cyclohexyl; or aryls such as phenyl, xylyl, tolyl, and naphthyl. In the preferred component (B), it is preferred that any $R^3$ radical other than methyl be selected from a group consisting of phenyl and 3,3,3-trifluoropropyl. The most preferred component (B) is a vinyldimethylsiloxy-terminated polydimethylsiloxane having a viscosity of about 40 Pa.s to 70 Pa.s at 25° C.

In a preferred composition, component (B) comprises a mixture comprising polyorganosiloxanes described by formula (2) and up to 30 weight percent of polyorganosiloxanes described by formula

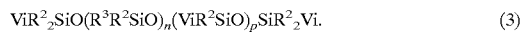

$$ViR^2{}_2SiO(R^3R^2SiO)_n(ViR^2SiO)_pSiR^2{}_2Vi. \qquad (3)$$

In Formula (3) Vi is vinyl, $R^2$ and $R^3$ are as previously described, the degree of polymerization represented by the sum of n and p is equivalent to a viscosity of about 0.1 Pa.s to 200 Pa.s at 25° C. and the ratio of p/(n+p) is within a range of 0 to about 0.05. Preferred is when the ratio of p/(n+p) is within a range of about 0.01 to 0.05. It is preferred that the degree of polymerization of polyorganosiloxanes described by formula (3) be less than that of polyorganosiloxanes described by formula (2) and that the viscosity be about 0.1 Pa.s to 20 Pa.s at 25° C. Preferred is when component (B) is a mixture comprising about 5 to 30 weight percent of polyorganosiloxanes described by formula (3) and the ratio of p/(n+p) is within a range of about 0.01 to 0.05, with the remainder of component (B) comprising polyorganosiloxanes described by formula (2). Even more preferred is when component (B) is a mixture comprising about 5 to 15 weight percent of polyorganosiloxanes described by formula (3) and the ratio of p/(n+p) is within a range of about 0.01 to 0.05, with the remainder of component (B) comprising polyorganosiloxanes described by formula (2).

To insure that the polyorganosiloxanes described by formulas (2) and (3) are miscible it is preferred that the $R^2$ and $R^3$ substituents of each polyorganosiloxane be the same. Preferred is when all $R^2$ and $R^3$ substituents are methyl.

Component (C) of the present composition is a treated reinforcing silica filler which comprises 7 to 50 weight percent of the composition. Preferred is when component (C) comprises 10 to 35 weight percent of the composition. The reinforcing silica filler can be of the fumed or precipitated type and should have a BET surface area of at least about 50 $m^2/g$. Preferred is when the reinforcing silica filler is of the fumed type. Preferred is when the reinforcing silica filler has a surface area greater than about 100 $m^2/g$. Even more preferred is when the reinforcing silica filler has a surface area within a range of about 200 $m^2/g$ to 500 $m^2/g$.

The reinforcing silica filler is treated with one or more low molecular weight organosilicon compounds to prevent a phenomenon referred to as "creping" or crepe hardening". The organosilicon compound treating agents reduce the interactions of the reinforcing silica filler with components (A) and (B) that can cause an increase in viscosity during blending and storage of the curable polyorganosiloxane-polyisobutylene composition to the extent that it may become difficult to process using conventional techniques and equipment.

The organosilicon compound for treating the reinforcing silica filler can be any of those known in the art for reducing creping. Such organosilicon compounds can include, for example, liquid silanol-containing organosilicon compounds and organosilicon compounds such as organodisilazanes that can be hydrolyzed to form these compounds under the conditions used to treat the reinforcing silica filler.

Hydrolyzable precursors of silanol-containing silica treating agents include, for example, cyclic polydiorganosiloxanes, silazanes, and linear polydiorganosiloxanes containing alkoxy or other readily hydrolyzable groups. Preferred silica treating agents include, for example, hexamethyldisilazane and low viscosity hydroxy-terminated polydimethylsiloxanes.

The method of treating the silica reinforcing filler with the organosilicon compound is not critical to the present composition and can be any of those known in the art. The silica reinforcing filler may be treated with the organosilicon compound prior to addition to the present composition. The silica reinforcing filler may be treated with the organosilicon compound in the presence of component (B). The silica reinforcing filler may be treated with the organosilicon compound in the presence of both component (A) and (B). All or a portion of the treated reinforcing silica filler may be added to the present composition as a blend with component (B).

Component (D) of the present composition is an organohydrogensiloxane crosslinker. When component (B) contains only two alkenyl substituents per molecule, component (D) must contain an average of at least 3 silicon-bonded hydrogen atoms per molecule. When component (B) contains three or more alkenyl substituents per molecule, component (D) must contain an average of at least two silicon-bonded hydrogen atoms per molecule. In component (D), no more than one silicon-bonded hydrogen atom can be bonded per silicon atom, the remaining valences of the silicon atoms are satisfied by divalent oxygen atoms or by hydrocarbon groups, for example, alkyls such as methyl, ethyl, and propyl; alkenyls such as vinyl, allyl, and hexenyl; aryls such as phenyl and tolyl; and substituted alkyls such as 3,3,3-trifluoropropyl and chloromethyl. The hydrocarbon groups can be selected to provide optimal compatibility of the organohydrogensiloxane crosslinker with the present compositions. Examples of organohydrogensiloxanes useful as crosslinkers in the present compositions are described for example, in Lee et al., U.S. Pat. No. 3,989,668, and Jensen, U.S. Pat. No. 4,753,978, both of which are incorporated herein by reference for teaching of such crosslinkers. The organohydrogensiloxane crosslinker can be linear, cyclic, or branched siloxane polymers, organohydrogensiloxane resin, or mixtures thereof.

The amount of component (D) useful in the present composition is that sufficient to cure the composition. Generally, a useful amount of component (D) is that sufficient to provide a ratio of silicon-bonded hydrogen atoms to alkenyl substituents provided by components (A) and (B) within a range of 1:10 to 10:1. Preferred is where the ratio of silicon-bonded hydrogen atoms of component (D) to alkenyl substituents of components (A) and (B) is within a range of about 1:1 to 5:1. More preferred is where the ratio of silicon-bonded hydrogen atoms of component (D) to alkenyl substituents of components (A) and (B) is within a range of about 1:1 to 2:1.

The present composition requires as component (E) a platinum group metal-containing catalyst in an amount sufficient to promote curing of the composition. The platinum group metal-containing catalyst can be any such catalyst which is known to catalyze the reaction of silicon-bonded hydrogen atoms with alkenyl groups. By "platinum group metal" it is meant ruthenium, rhodium, palladium, osmium, iridium, and platinum. The platinum group metal-containing catalyst can be metal halides and salts such as platinum dichloride and chloroplatinic acid. The platinum group metal-containing catalyst can be, for example, complexes prepared from chloroplatinic acid as described by Willing, U.S. Pat. No. 3,419,593, which is hereby incorporated by reference. The platinum group metal-containing catalyst can be, for example, platinum organosiloxane complexes made by contacting a platinum halide with an unsaturated organosiloxane as described in Karstedt U.S. Pat. No. 3,814,730, which is hereby incorporated by reference. The platinum group metal-containing catalyst can be, for example, a platinum organosiloxane complex made by contacting a platinous halide with an organosiloxane as described in Brown et al., U.S. Pat. No. 5,175,325. A preferred platinum group metal-containing catalyst is a neutralized reaction product of platinum dichloride with sym-divinyltetramethyldisiloxane prepared by a process similar to that described by Brown et al., supra.

Other examples of useful platinum group metal-containing catalysts can be found in Lee et al., U.S. Pat. No. 3,989,668; Chang et al., U.S. Pat. No. 5,036,117; Ashby U.S. Pat. No. 3,159,601; Lamoreaux, U.S. Pat. No. 3,220,972; Chalk et al., U.S. Pat. No. 3,296,291; Modic, U.S. Pat. No. 3,516,946; and Chandra et al., U.S. Pat. No. 3,928,629 all of which are hereby incorporated by reference to show useful platinum group metal-containing catalysts and methods for their preparation.

The amount of platinum group-metal containing catalyst useful in effecting curing of the present composition is not narrowly limited as long as there is a sufficient amount present to accelerate a reaction between the silicon-bonded hydrogen atoms of component (D) and the alkenyl substituents of components (A) and (B). The appropriate amount of the platinum group metal containing catalyst will depend upon the particular catalyst used. In general as low as about 0.001 part by weight of platinum group metal for every million parts (ppm) by weight of the polyorganosiloxane-polyisobutylene composition may be useful. Preferably the amount of platinum group metal is at least 1 ppm on the same basis. More preferred is at least 1 ppm to about 10,000 ppm platinum group metal, on the same basis.

The present polyorganosiloxane-polyisobutylene composition may cure rapidly at room temperature. To hinder the curing process an inhibitor may optionally be added to the composition. The inhibitor can be any of those materials known to inhibit the catalytic activity of platinum group metal-containing catalysts. By the term "inhibitor" it is meant a material that retards the room temperature curing of the composition when incorporated in the composition at less than about 10 weight percent, without preventing the elevated temperature curing of the composition.

A preferred class of inhibitors useful in the present composition are acetylenic alcohols as described in Kookootsedes et al., U.S. Pat. No. 3,445,420, which is hereby incorporated by reference. Such acetylenic alcohols are exemplified by 1-ethynyl-1-cyclohexanol and 2-methyl-3-butyn-2-ol. Other examples of classes of inhibitors which may be useful in the present composition are described in Chung et al., U.S. Pat. No. 5,036,117, which is hereby incorporated by reference.

The amount of inhibitor useful in the present composition is not critical and can be any amount that will retard the platinum group metal-containing catalyst catalyzed reaction of the silicon-bonded hydrogen atoms of component (D) with the alkenyl substituents of components (A) and (B), while not preventing the reaction at elevated temperatures. The specific amount of inhibitor to be used will depend upon the particular inhibitor, the concentration and type of catalyst, and the nature and amounts of components (A), (B), and (D). Generally, when an inhibitor is used it is preferred that at least one mole of inhibitor be present for each mole of platinum group metal in the composition and that the inhibitor not exceed one weight percent of the composition.

The present composition may contain other components such as mold release agents, colorants, and extending fillers such as ground quartz as long as such components do not undesirably effect properties of cured articles prepared from the composition.

The present compositions are useful as materials of fabrication for articles of manufacture such as face mask and automotive hoses and as coatings to form composites, for example, with natural and synthetic fabrics for use in such applications as tents and protective clothing.

EXAMPLES

The following examples are provided to illustrate the present invention. These examples are not intended to limit the scope of the claims herein.

A polyorganosiloxane base composition, Base 1, was prepared by mixing components 1–6 as described in Table 1 at the described weight percentages and heating the mixture. Component 7–10 were then added to the composition at the weight percent described in Table 1. All viscosities described in Table 1 are as determined at 25° C. The molecular weight numbers are number average molecular weights ($M_n$), determined by gel permeation chromatograph.

Permeability of elastomer prepared from the compositions described in the Examples was determined using DOD Spec. CRDC-SP-84010. The elastomers were tested for both water vapor permeability and mustard gas, bis(2-chloroethyl)sulfide, permeability. The test material was placed on the elastomer at a concentration of 10 grams per square meter in a closed chamber. The breakthrough time in hours (h) for permeation of the mustard gas and the steady state permeation rate ($g/cm^3/h$) for the water vapor through the elastomer was determined. The results are provided in Table 2.

Example 1

A mixture comprising 30 weight percent of the polyorganosiloxane base described in Table 1 and 70 weight percent of vinyl end-terminated polyisobutylene having a $M_n$ of 5,000 was formed. To this mixture was added an additional 7.1 weight percent of the methylhydrogensiloxane crosslinker described in Table 1, based on the weight of the polyorganosiloxane-polyisobutylene mixture. An additional 0.05 weight percent of 1-ethynyl-1-cyclohexanol, based on the weight of the polyorganosiloxane-polyisobutylene mixture, was added as an inhibitor. An additional 0.38 weight percent, based on the weight of the polyorganosiloxane-polyisobutylene mixture, of a neutralized complex of platinum dichloride with sym-divinyltetramethyldisiloxane as described in Table 1 was added. After mixing, the composition was press cured at 150° C. for 20 minutes. The cured elastomer was evaluated for water vapor permeability and mustard gas permeability by the methods described above and the results are reported in Table 2.

Example 2

The cured elastomer of Example 1 was post-cured at 177° C. for 1 hour, permeability evaluated as described above, and the results are described in Table 2.

Example 3

A mixture comprising 70 weight percent of the polyorganosiloxane base described in Table 1 and 30 weight percent of vinyl end-terminated polyisobutylene having a $M_n$ of 5,000 was formed. To this mixture was added an additional 3 weight percent of the methylhydrogensiloxane crosslinker described in Example 1 and about 0.38 weight percent of the platinum catalyst described in Example 1, both weight percents based on the weight of the polyorganosiloxane-polyisobutylene mixture. The composition was press cured at 150° C. for 20 minutes. The cured elastomer was evaluated for permeability as described above and the results are described in Table 2.

Example 4

A cured elastomer prepared as described in Example 3 was post-cured at 177° C. for 1 hour, permeability evaluated as described in Example 1, and the results are given in Table 2.

Example 5

A mixture comprising 70 weight percent of the polyorganosiloxane base described in Table 1 and 30 weight percent of vinyl end-terminated polyisobutylene having a $M_n$ of 10,000 was formed. To this mixture was added and additional 1.4 weight percent of the methylhydrogensiloxane crosslinker described in Example 1 and about 0.38 weight percent of the platinum catalyst described in Example 1, both weight percents based on the weight of the polyorganosiloxane-polyisobutylene mixture. The composition was press cured at 150° C. for 20 minutes. The cured elastomer was evaluated for permeability as described above and the results are described in Table 2.

Example 6

A cured elastomer prepared as described in Example 5 was post-cured at 177° C. for 1 hour, permeability was evaluated as described in Example 1, and the results are given in Table 2.

Example 7

A mixture comprising 30 weight percent of the polyorganosiloxane base described in Table 1 and 70 weight percent of vinyl end-terminated polyisobutylene having a $M_n$ of 10,000 was formed. To this mixture was added an additional 3.3 weight percent of the methylhydrogensiloxane crosslinker described in Example 1 and about 0.38 weight percent of the platinum catalyst described in Example 1, both weight percent based on the weight of the polyorganosiloxane-polyisobutylene mixture. The composition was press cured at 150° C. for 20 minutes. The cured elastomer was evaluated for permeability as described above and the results are described in Table 2.

Example 8

A cured elastomer prepared as described in Example 7 was post-cured at 177° C. for 1 hour, permeability evaluated as described in Example 1, and the results are given in Table 2.

Example 9

A series of compositions within the scope of the present invention were prepared and their physical properties determined.

A polyorganosiloxane composition as described in Table 1 was blended with a vinyl end-terminated polyisobutylene. The ratio of polyorganosiloxane composition as described in Table 1 to the polyisobutylene is described in Table 3 under the heading "Si/PIB". The $M_n$ of the polyisobutylene is described in Table 3 under the heading "$M_n$ PIB". Additional organohydrogensiloxane crosslinker as described in Table 1 was added to the composition to provide a final SiH to Vinyl ratio as described in Table 3 under the heading "SiH/Vi". Additional treated silica as described in Table 1 was added to the composition to provide a final weight percent of silica, based on the weight of the composition, as described in Table 3 under the heading "Wt. % Silica". Additional platinum was added to the composition as the platinum complex described in Table 1 to provide for a final platinum concentration of about 60 ppm, based on the weight of the composition. Samples of the compositions were cured at 150° C. for 20 minutes in appropriate configurations for physical properties testing. The physical properties of the cured samples were determined by the following test methods: shore A durometer (Duro. A) ASTM 2240, tear (die B) ASTM 625, compression set ASTM 395, and tensile, elongation, and modulus (100%) by ASTM 412. The results of the physical properties testing are reported in Table 4.

TABLE 4

Physical Properties of Polyorganosiloxane-Polyisobutylene Compositions

|  | 9A | 9B | 9C | 9D | 9E |
|---|---|---|---|---|---|
| Duro (Shore A) | 76 | 58 | 65 | 76 | 77 |
| Tensile, MPa | 4.58 | 5.44 | 4.60 | 5.14 | 4.23 |
| Tear (Die B), kN/m | 8.75 | 9.63 | 13.65 | 8.48 | 13.13 |
| Elongation, % | 141 | 285 | 324 | 172 | 164 |
| Modulus (@ 100), MPa | 4.68 | 2.72 | 2.13 | 4.16 | 3.63 |
| Compression Set, % | 14 | 15 | 24 | 20 | 17 |

Example 10

A mixture comprising 1 wt % polyorganosiloxane base, Base 2, described in Table 5 and 87 wt % of vinyl end-terminated polyisobutylene having a molecular weight ($M_n$) of 16,000 was formed. To this mixture was added an

TABLE 1

Composition of Polyorganosiloxane Base 1

| No. | Wt. % | Description |
|---|---|---|
| 1 | 58.0 | 55 Pa · s Vinyldimethylsiloxy-terminated polydimethylsiloxane |
| 2 | 7.9 | 0.35 Pa · s Vinyldimethylsiloxy-terminated polydimethylsiloxane fluid having pendant vinyl substitution and a pendant vinyl content of 2 mole percent |
| 3 | 0.14 | 1,3-Divinyltetramethyldisilazane |
| 4 | 4.4 | Hexamethyldisilazane |
| 5 | 1.1 | Water |
| 6 | 26.4 | Fumed silica, BET surface area of 400 M$^2$/g |
| 7 | 0.5 | 0.041 Pa · s Hydroxyl end-terminated polydimethylsiloxane fluid |
| 8 | 0.03 | 1-Ethynyl-1-cyclohexanol |
| 9 | 1.5 | Methylhydrogensiloxane described by formula Me$_3$SiO(Me$_2$SiO)$_5$(HMeSiO)$_3$SiMe$_3$, where Me is methyl |
| 10 | 0.119 | Neutralized complex of platinum dichloride with sym-divinyltetramethyldisiloxane (0.46 weight percent platinum) |

TABLE 2

Permeability to Mustard Gas and Water Vapor

| Example No. | Water Vapor Permeation Rate g/cm$^3$/h | Mustard Gas Breakthrough Time (h) |
|---|---|---|
| 1 | *— | 24 |
| 2 | — | 24 |
| 3 | 0.0025 | 2 |
| 4 | 0.0025 | 2 |
| 5 | 0.0025 | 2 |
| 6 | 0.0025 | 2 |
| 7 | 0.0005 | 24 |
| 8 | 0.0005 | 24 |

*Indicates data not available

TABLE 3

Composition Descriptions for Example 9

| Example No | Si/PIB | $M_n$ PIB | Wt. % Silica | SiH/Vi |
|---|---|---|---|---|
| 9A | 40/60 | 5,000 | 50 | 1.5 |
| 9B | 60/40 | 5,000 | 20 | 1.5 |
| 9C | 40/60 | 10,000 | 50 | 1.5 |
| 9D | 60/40 | 5,000 | 50 | 2.5 |
| 9B | 40/60 | 10,000 | 50 | 2.5 | additional 30 wt %, based on the mass of polyisobutylene in the mixture, of treated fumed silica. An additional 3.3 wt % of methyhydrogensiloxane crosslinker described in table 1, based on the weight of the polyorganosiloxane-polyisobutylene mixture was added. An additional 0.05 wt % of 1-ethynyl-1-cyclohexanol, based on the weight of the polyorganosiloxane-polyisobutylene mixture, was added as an inhibitor. An additional 0.019 wt %, based on the weight of the polyorganosiloxane-polyisobutylene mixture, of a neutralized complex of platinum dichloride with sym-divinyltetramethyldisiloxane (20 wt % platinum). After mixing, the composition was press cured at 150° C. for 20 minutes.

Example 11

A mixture comprising 20 wt % polyorganosiloxane base described in Table 5 and 80 wt % of vinyl end-terminated polyisobutylene having a ($M_n$) of 16,000 was formed. To this mixture was added an additional 30 wt %, based on the mass of polyisobutylene in the mixture, of treated fumed silica. To this mixture was added an additional 2.6 wt % of methyhydrogensiloxane crosslinker described in Table 5 based on the weight of the polyorganosiloxane-polyisobutylene mixture. An additional 0.05 wt % of 1-ethynyl-1-cyclohexanol, based on the weight of the polyorganosiloxane-polyisobutylene mixture, was added as an inhibitor. An additional 0.012 wt %, based on the weight of the polyorganosiloxane-polyisobutylene mixture, of a neutralized complex of platinum dichloride with sym-divinyltetramethyldisiloxane (20 wt % platinum). After mixing, the composition was press cured at 150° C. for 20 minutes.

Example 12

A mixture comprising 5 wt % polyorganosiloxane base described in Table 5 and 95 wt % of vinyl end-terminated polyisobutylene having a ($M_n$) of 16,000 was formed. To this mixture was added an additional 30 wt %, based on the mass of polyisobutylene in the mixture, of treated fumed silica. To this mixture was added an additional 3.1 wt % of methyhydrogensiloxane crosslinker described in table 1, based on the weight of the polyorganosiloxane-polyisobutylene mixture. An additional 0.05 wt % of 1-ethynyl-1-cyclohexanol, based on the weight of the polyorganosiloxane-polyisobutylene mixture, was added as an inhibitor. An additional 0.014 wt %, based on the weight of the polyorganosiloxane-polyisobutylene mixture, of a neutralized complex of platinum dichloride with sym-divinyltetramethyldisiloxane (20 wt % platinum). After mixing, the composition was press cured at 150° C. for 20 minutes.

Physical Properties for these samples are listed in Table 6 below

TABLE 5

Composition of Polydimethylsiloxane Base 2.

| No. | Wt. % | Description |
|---|---|---|
| 1 | 54.1 | 55 Pa · s Vinyldimethylsiloxy-terminated polydimethylsiloxane |
| 2 | 8.61 | 0.35 Pa · s Vinyldimethylsiloxy-terminated polydimethylsiloxane fluid having pendant vinyl substitution and a pendant vinyl content of 2 mole percent |
| 3 | 0 | 1,3-Divinyltetramethyldisilazane |
| 4 | 6.10 | Hexamethyldisilazane |
| 5 | 1.50 | Water |
| 6 | 27.6 | Fumed silica, BET surface area of 400 M²/g |
| 7 | 0.50 | 0.041 Pa · s Hydroxyl end-terminated polydimethylsiloxane fluid |
| 8 | 0.05 | 1-Ethynyl-1-cyclohexanol |
| 9 | 1.25 | Methylhydrogensiloxane described by formula $Me_3SiO(Me_2SiO)_5(HMeSiO)_3SiMe_3$, where Me is methyl |
| 10 | 0.13 | Neutralized complex of platinum dichloride with sym-divinyltetramethyldisiloxane (0.46 weight percent platinum) |

TABLE 6

| Sample | Tensile MPa | elongation % | stress at 100% elongation, MPa | Tear kg/m | Durometer Shore A |
|---|---|---|---|---|---|
| 1 | 8.02 | 626 | 0.910 | 1460 | 44 |
| 2 | 10.2 | 789 | 0.848 | 1570 | 45 |
| 3 | 4.59 | 500 | 1.19 | 1390 | 45 |

We claim:

1. A curable polydiorganosiloxane-polyisobutylene composition comprising
   (A) 20 to 87 weight percent of a polyisobutylene comprising at least 2 alkenyl groups per molecule,
   (B) 0.4 to 70 weight percent of a polyorganosiloxane comprising at least 2 silicon-bonded alkenyl groups per molecule,
   (C) 7 to 50 weight percent of a treated reinforcing silica filler,
   (D) an amount sufficient to cure the composition of an organohydrogensiloxane crosslinker, and
   (E) a platinum-group metal hydrosilation catalyst in an amount sufficient to effect curing of the composition.

2. A composition according to claim 1, where the polyisobutylene has a number average molecular weight within a range of about 200 to 100,000.

3. A composition according to claim 1, where the polyisobutylene has a number average molecular weight within a range of about 200 to 50,000.

4. A composition according to claim 1, where the polyisobutylene has a number average molecular weight within a range of about 2,000 to 20,000.

5. A composition according to claim 1, where the polyisobutylene comprises about 50 to 87 weight percent of the total weight of the composition.

6. A composition according to claim 1, where the polyisobutylene is an alkenyl end-terminated polyisobutylene.

7. A composition according to claim 6, where the polyisobutylene is an alkenyl end-terminated polyisobutylene described by formula $R^1\{(CH_2C(CH_3)_2\}_nCH_2R^1$, where n is a number such that the number average molecular weight of the alkenyl end-terminated polyisobutylene is within a range of about 200 to 100,000 and each $R^1$ is an alkenyl group comprising about 2 to 12 carbon atoms.

8. A composition according to claim 7, where n is a number such that the number average molecular weight of the alkenyl end-terminated polyisobutylene is within a range of about 2,000 to 20,000 and $R^1$ is vinyl.

9. A composition according to claim 1, where the polyorganosiloxane comprises about 5 to 30 weight percent of the total weight of the composition.

10. A composition according to claim 1, where component (B) comprises a polydiorganosiloxane described by formula

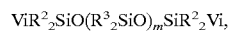
$ViR^2{}_2SiO(R^3{}_2SiO)_mSiR^2{}_2Vi$, where Vi represent a vinyl radical, $R^2$ and $R^3$ are independently selected saturated monovalent hydrocarbon radicals comprising about one to 20 carbon atoms, and m represents a degree of polymerization equivalent to a viscosity of about 20 Pa.s to 200 Pa.s at 25° C.

11. A composition according to claim 10, where component (B) further comprises up to 30 weight percent of a polyorganosiloxane described by formula

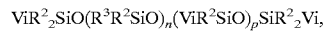
$ViR^2{}_2SiO(R^3R^2SiO)_n(ViR^2SiO)_pSiR^2{}_2Vi$, where Vi, $R^2$, and $R^3$ are as previously described, n+p represents a degree of polymerization equivalent to a viscosity of about 0.1 Pa.s to 20 Pa.s at 25° C. and the ratio of p/(n+p) is within a range of about 0.01 to 0.05.

12. A composition according to claim 11 where $R^2$ and $R^3$ are methyl.

13. A composition according to claim 1, where the polydiorganosiloxane is a vinyldimethylsiloxy-terminated polydimethylsiloxane having a viscosity of about 40 Pa.s to 70 Pa.s at 25° C.

14. A composition according to claim 1, where the treated reinforcing silica filler comprises 10 to 35 weight percent of the composition.

15. A composition according to claim 1, where the treated reinforcing silica filler has a surface area within a range of about 200 $m^2/g$ to 500 $m^2/g$.

16. A composition according to claim 1, where the organohydrogensiloxane crosslinker provides a ratio of silicon-bonded hydrogen atoms to alkenyl substituents provided by components (A) and (B) within a range of 1:10 to 10:1.

17. A composition according to claim 1, where the organohydrogensiloxane crosslinker provides a ratio of silicon-bonded hydrogen atoms to alkenyl substituents provided by components (A) and (B) within a range of about 1:1 to 2:1.

18. A composition according to claim 1, where the platinum group metal-containing catalyst is a neutralized reaction product of platinum dichloride with sym-divinyltetramethyldisiloxane.

19. An article of manufacture prepared from a composition comprising (A) 20 to 87 weight percent of a polyisobutylene comprising at least 2 alkenyl groups per molecule, (B) 0.4 to 70 weight percent of a polyorganosiloxane comprising at least 2 silicon-bonded alkenyl groups per molecule, (C) 7 to 50 weight percent of a treated reinforcing silica filler, (D) an amount sufficient to cure the composition of an organohydrogensiloxane crosslinker, and (E) a platinum-group metal hydrosilation catalyst in an amount sufficient to effect curing of the composition.

20. A composite material comprising a cured polydiorganosiloxane-polyisobutylene composition prepared by curing a composition comprising (A) 20 to 87 weight percent of a polyisobutylene comprising at least 2 alkenyl groups per molecule, (B) 0.4 to 70 weight percent of a polyorganosiloxane comprising at least 2 silicon-bonded alkenyl groups per molecule, (C) 7 to 50 weight percent of a treated reinforcing silica filler, (D) an amount sufficient to cure the composition of an organohydrogensiloxane crosslinker, and (E) a platinum-group metal hydrosilation catalyst in an amount sufficient to effect curing of the composition.

21. A cured polydiorganosiloxane-polyisobutylene composition comprising the cured product of a composition comprising (A) 20 to 87 weight percent of a polyisobutylene comprising at least 2 alkenyl groups per molecule, (B) 0.4 to 70 weight percent of a polyorganosiloxane comprising at least 2 silicon-bonded alkenyl groups per molecule, (C) 7 to 50 weight percent of a treated reinforcing silica filler, (D) an amount sufficient to cure the composition of an organohydrogensiloxane crosslinker, and (E) a platinum-group metal hydrosilation catalyst in an amount sufficient to effect curing of the composition.

* * * * *